US009321247B2

(12) United States Patent
Haruta et al.

(10) Patent No.: US 9,321,247 B2
(45) Date of Patent: Apr. 26, 2016

(54) TRANSPARENT FILM AND USE THEREOF

(75) Inventors: Hiromoto Haruta, Ibaraki (JP); Hirokazu Matsuda, Ibaraki (JP); Tsuyoshi Inoue, Ibaraki (JP); Kazuhito Okumura, Ibaraki (JP); Osamu Kondo, Ibaraki (JP); Yoko Muraoka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 766 days.

(21) Appl. No.: 13/383,656

(22) PCT Filed: Jul. 9, 2010

(86) PCT No.: PCT/JP2010/061694
§ 371 (c)(1), (2), (4) Date: Mar. 7, 2012

(87) PCT Pub. No.: WO2011/007728
PCT Pub. Date: Jan. 20, 2011

(65) Prior Publication Data

US 2012/0231265 A1 Sep. 13, 2012

(30) Foreign Application Priority Data

Jul. 15, 2009 (JP) ................................ 2009-167207

(51) Int. Cl.
*B32B 27/08* (2006.01)
*G02B 1/10* (2015.01)
*C09J 7/02* (2006.01)

(52) U.S. Cl.
CPC ............... *B32B 27/08* (2013.01); *C09J 7/0296* (2013.01); *G02B 1/105* (2013.01); *C09J 2201/606* (2013.01); *Y10T 428/26* (2015.01)

(58) Field of Classification Search
None
See application file for complete search history.

(56) References Cited

U.S. PATENT DOCUMENTS

| | | | | |
|---|---|---|---|---|
| 2004/0114248 | A1 | 6/2004 | Hokazono et al. | |
| 2005/0255325 | A1 | 11/2005 | Inagaki | |
| 2007/0071967 | A1 | 3/2007 | Inagaki et al. | |
| 2007/0141329 | A1 * | 6/2007 | Yang et al. | 428/343 |
| 2011/0179997 | A1 | 7/2011 | Hayata et al. | |
| 2011/0206917 | A1 | 8/2011 | Niimi et al. | |
| 2011/0209994 | A1 | 9/2011 | Hayata et al. | |
| 2011/0229703 | A1 | 9/2011 | Hayata et al. | |
| 2011/0281067 | A1 | 11/2011 | Yoshida et al. | |
| 2012/0077026 | A1 | 3/2012 | Igarashi et al. | |

FOREIGN PATENT DOCUMENTS

| | | | |
|---|---|---|---|
| CN | 1266489 | | 7/2006 |
| CN | 1894101 | | 1/2007 |
| JP | 7-26223 | A | 1/1995 |
| JP | 2003-80639 | A | 3/2003 |
| JP | 2003-121606 | A | 4/2003 |
| JP | 2003-320631 | A | 11/2003 |
| JP | 2004-223714 | | 8/2004 |
| JP | 2005-314563 | A | 11/2005 |
| JP | 2007-283665 | A | 11/2007 |
| WO | 02/084338 | | 10/2002 |

OTHER PUBLICATIONS

Chinese Office Action dated Jun. 4, 2014 in CN 201080029912.1 and English language translation.
Japanese Office Action in JP2009-167207, mailed Jul. 18, 2013 and English language translation thereof.
Chinese Office Action in CN 201080029912.1, dated Nov. 22, 2013 along with an english translation thereof.
U.S. Appl. No. 13/304,778 to Ryohei Sawazaki et al., filed Nov. 28, 2011.
U.S. Appl. No. 13/304,793 to Keiji Hayashi et al., filed Nov. 28, 2011.
U.S. Appl. No. 13/304,984 to Jiro Yamato et al., filed Nov. 28, 2011.
U.S. Appl. No. 13/304,820 to Mariko Yoshida et al., filed Nov. 28, 2011.
U.S. Appl. No. 13/339,900 to Jiro Yamato et al., filed Dec. 29, 2011.
U.S. Appl. No. 13/383,703 to Hiromoto Haruta et al., filed Jan. 12, 2012.
"International Search Report (ISR).", Application No. PCT/JP2010/061694, Oct. 19, 2010, pp. 1-4.
Chinese Office action issued with respect to application No. 201080029912.1, mail date is Oct. 30, 2014.
Taiwanese Office Action issued with respect to application No. 099123173, mail date is Mar. 3, 2015.

* cited by examiner

*Primary Examiner* — Sheeba Ahmed
(74) *Attorney, Agent, or Firm* — Greenblum & Bernstein, P.L.C.

(57) ABSTRACT

A transparent film, the back-face of which has excellent resistance to scratch and printability, and a surface protection film which has such a transparent film are provided. A transparent film 10 has a substrate layer 12 formed of a transparent resin material, and a back-face layer 14 with a thickness of 1 μm or less provided on a first face 12A thereof. A percent change in coefficient of friction $\Delta\mu$ is less than 10% for the transparent film 10 when the percent change is determined from a coefficient of friction $\mu_{50}$ of the back-face layer after being conserved at 50° C. and 15% RH for three days and a coefficient of friction $\mu_{80}$ of the back-face layer after being conserved at 80° C. and 80% RH for three days, with an absolute value of difference between the two coefficients of friction $|\mu_{80}-\mu_{50}|$ being divided by the smaller value of the two coefficients of friction.

20 Claims, 1 Drawing Sheet

TRANSPARENT FILM AND USE THEREOF

TECHNICAL FIELD

The present invention relates to a transparent film that is not easily scratch-marked on the back-face and exhibits excellent printing properties and a surface protection film provided with such a film. The present application claims priority based on Japanese Patent Application No. 2009-167207 filed on Jul. 15, 2009, the contents of which are incorporated herein in its entirety by reference.

BACKGROUND ART

A surface protection film (also referred to as a surface protection sheet) in general has a constitution in which a pressure-sensitive adhesive (PSA) is provided over a film-shaped support. Such a protection film is bonded matchingly to an adherend through the PSA and thereby used with the purpose of protecting the adherend from scratches and dirt during processing, transport and the like. For instance, a polarizer that is bonded matchingly to a liquid crystal cell in the manufacturing of a liquid crystal display panel is manufactured once in the morphology of a roll, then unwound from this roll and cut to the desired size according to the shape of the liquid crystal cell and used. Here, in order to prevent the polarizer from being scratched by friction with a transport roll, or the like, in an intermediate step (for instance, a transport step during manufacturing of the polarizer in the roll morphology, during use of the polarizer, or the like), a measure is taken, of bonding a surface protection film matchingly to one face or both faces (typically one face) of the polarizer. The following Patent Documents 1 and 2 may be cited as technical documents related to surface protection films.

PRIOR ART

Patent Document

[Patent document 1] Japanese Patent Application Publication No. 2003-320631
[Patent document 2] Japanese Patent Application Publication No. 2005-314563

DISCLOSURE OF THE INVENTION

Problem to be Solved by the Invention

Transparent ones are preferably used as such surface protection films, given that an inspection of the external appearance of the adherend (for instance polarizer) may be carried out with the film left bonded thereto. In recent years, from such point of view as the ease of performance of the external appearance inspection, the level of requirement towards the quality level of the external appearance of the surface protection film has been raising. In particular, the quality of not being readily scratch-marked on the back-face of the surface protection film (the face on the opposite side from the face that is bonded to the adherend) is sought. The reason is that if a scratch mark is present on the surface protection film, whether this scratch is a scratch from the adherend or a scratch from the surface protection film cannot be assessed while the surface protection film is left in a bonded state.

Meanwhile, in processes such as fabrication and transport of an adherend (for instance, an optical part) that use a surface protection film, there is the demand of wishing to write on the surface protection film and display the identification number, or the like, of the adherend subjected to protection. Therefore, a surface protection film provided with a quality (printability) that allows printing to be performed readily and appropriately for instance with an oil-based ink (for instance, using an oil-based marking pen) is desirable. However, since generally resistance to scratch and printability are oppositely related, providing both these capabilities stably at high levels is difficult.

Thus, an object of the present invention is to provide a transparent film that cannot be easily scratch-marked on the back-face (that is to say, having excellent resistance to scratch) and exhibits excellent printing properties, and therefore is suitable for an application such as a support in a surface protection film. Another object of the present invention is to provide a surface protection film of a constitution having a PSA layer on one face of such a transparent film.

Means for Solving the Problem

The present inventors focused on the point that the coefficient of friction of a back-face layer in a surface protection film was likely to change over time and studied in detail the relationship between the change in the coefficient of friction over time and stability, resistance to scratch and other properties. As a result, they discovered that by restricting the change in the coefficient of friction over time to a given extent or less, resistance to scratch and printability may both be provided stably at high level, and completed the present.

That is to say, the transparent film provided by the present invention has a substrate layer formed of a transparent resin material, and a back-face layer provided on a first face of the substrate layer. The back-face layer has a thickness of 1 μm or less. In the transparent film, a percent change in coefficient of friction $\Delta\mu$ is less than 10% (typically 0% or greater but less than 10%) when the percent change is determined from a coefficient of friction $\mu_{50}$ of the back-face layer after being conserved at a temperature of 50° C. and a relative humidity of 15% for three days and a coefficient of friction $\mu_{80}$ of the back-face layer after being conserved at a temperature of 80° C. and a relative humidity of 80% for three days, with an absolute value of difference between the two coefficients of friction $|\mu_{80}-\mu_{50}|$ being divided by the smaller value of the two coefficients of friction $\mu_{50}$ and $\mu_{80}$ (hereafter this may be represented as "$\min(\mu_{50},\mu_{80})$").

In the art disclosed herein, the extent of stability with respect to the change over time of the coefficient of friction of the back-face layer is appreciated through the percent change in coefficient of friction $\Delta\mu$ defined by $\Delta\mu=|\mu_{80}-\mu_{50}|/\min(\mu_{50},\mu_{80})$. A transparent film that meets $\Delta\mu<10\%$ (typically $0\%\leq\Delta\mu<10\%$) may exert resistance to scratch and printability at high levels stably, as the state of the back-face layer surface changes little over time. A transparent film that demonstrate high resistance to scratch and printability stably in this way is suitable as a support of a surface protection film. In addition, as the back-face layer has a small thickness, there is little influence exerted on the properties of the substrate layer (optical properties, dimensional stability and the like), which is desirable. In addition, if the thickness of the back-face layer is exceedingly greater than 1 μm, when the back-face layer contains a component that is prone to being colored, the coloration of the entirety of the transparent film may stand out, and when cure shrinkage arises accompanying the formation of the back-face layer, the transparent film may become prone to curling due to the shrinkage, such that reducing the thickness of the back-face layer to within a range where the desired capability (for instance resistance to scratch) is realized is also desirable from the point that the coloration or curling may be prevented or attenuated. As resin materials constituting the substrate layer, those having as a base resin a polyester resin such as polyethylene terephthalate resin, polyethylene naphthalate resin, or the like, may be preferably adopted.

In one preferred mode of the art disclosed herein, the coefficients of friction $\mu_{50}$ and $\mu_{80}$ are both 0.4 or less (for instance, 0.2 or greater but 0.4 or less). A transparent film that meets the percent change in coefficient of friction $\Delta\mu$ and the coefficients of friction $\mu_{50}$ and $\mu_{80}$, may demonstrate a higher resistance to scratch in addition to satisfactory printability.

It is desirable for the transparent film disclosed herein that the peel strength (back-face peel strength) is 2 N/19 mm or greater as measured by bonding a PSA tape to the back-face layer and peeling the PSA tape from the back-face layer under the conditions of 0.3 m/minute peel speed and 180 degrees peel angle. A transparent film demonstrating such a peel strength is adequate as a support of a surface protection film. That is to say, a surface protection film that has finished serving the role of protection is peeled-off and removed from the adherend (for instance, an optical member such as a polarizer). In so doing, bonding a PSA tape on the back-face of the surface protection film (the surface of the back-face layer) and pulling the PSA tape to separate an extremity of the surface protection film from the adherend allows the workability when removing the surface protection film to be improved and at the same time the burden imposed on the adherend to be attenuated. A surface protection film having the transparent film as a support is suited to the peeling operation that uses a PSA tape, since the back-face layer has an adequate degree of peel strength.

From the points of view of strength and productivity, or the like, a monolayer structure is desirable as a structure for the back-face layer. In addition, it is desirable that the back-face layer is provided on a first face of the substrate layer. With a constitution in which one, two or more intermediate layers are intercalated between the back-face layer and the substrate layer, sometimes the adhesiveness of the intermediate layer to the substrate layer and the back-face layer is insufficient and the failure initiation load of the back-face layer becomes prone to decreasing. Consequently, adaptation of a constitution in which a back-face layer is provided directly on the substrate layer is advantageous.

In one preferred mode, the back-face layer comprises a resin material containing a lubricant. Lubricant herein refers to a component that, by being mixed in the resin material, has the action of decreasing the coefficient of friction thereof. The back-face layer like this, which is formed of a resin material containing a lubricant, is preferable since such a layer facilitates the development of a transparent film having excellent resistance to scratch. The use of the lubricant is advantageous to realize the transparent film that satisfies the preferred coefficient of friction (in particular, $\mu_{50}$) disclosed herein As the lubricant, a reactive lubricant having a functional group capable of bonding a resin component of the back-face layer is preferably adopted. With such a reactive lubricant bonded to a resin component of the back-face layer, movement thereof is suppressed, and moreover the occurrence of excessive resin bleeding or insufficient resin distribution over the back-face layer surface over time is suppressed. Therefore, in use of the above lubricant, a transparent film that satisfies the preferred coefficient of friction $\Delta\mu$ disclosed herein may be easily obtained.

In another preferred mode, the back-face layer comprises a resin material containing an antistatic component. With a transparent film of such constitution, the back-face layer can be utilized to confer resistance to scratch and antistatic properties. Accordingly, the productivity of the transparent film is better compared to a constitution in which the antistatic layer is provided separately from the back-face layer. In addition, the adhesiveness between the back-face layer and the substrate layer can be raised compared to a constitution in which an antistatic layer is intercalated between the back-face layer and the substrate layer, the development of a transparent film having excellent resistance to scratch is facilitated. Given that providing both satisfactory antistatic properties and high resistance to scratch is straightforward, an electrically conductive polymer can be adopted preferably as the antistatic component.

The present invention additionally provides a surface protection film provided with any transparent film disclosed herein as a support. The surface protection film is typically provided with the transparent film and a PSA layer provided on the surface that is on the opposite side from the back-face layer of the transparent film. Such a surface protection film is in particular suitable as a surface protection film for optical parts.

BEST MODE FOR CARRYING OUT THE INVENTION

Preferred embodiments of the present invention will be described below. Matters other than the particulars specifically alluded to herein, which are matters required in carrying out the present invention, may be understood as design particulars based on prior art in the relevant field by a person of ordinary skill in the art. The present invention can be carried out based on the contents disclosed herein and general knowledge in the relevant field.

In addition, embodiments described in the figures are schematized in order to describe the present invention clearly and do not represent accurately the size or the scale of the transparent film or the surface protection film of the present invention actually provided as a product.

Having excellent resistance to scratch and exhibiting preferable printing properties, the transparent film disclosed herein may be used preferably in the support of a PSA sheet and other applications. Such a PSA sheet, in general, may be of a morphology referred to as PSA tape, PSA label, PSA film and the like. Among these, being suitable as a support in a surface protection film and given that inspection of the external appearance of a product may be carried out accurately through the film, the transparent film is suitable in particular as a support in a surface protection film for protecting, during fabrication or during transport of an optical part, the surface of the optical part (for instance, an optical part used as a liquid crystal display panel constituent such as a polarizer or a wave plate). The surface protection film disclosed herein is characterized by having a PSA layer on one face of the transparent film. While the PSA layer is typically formed continuously, there is no limitation to such a morphology, and the PSA layer may be formed for instance in a regular or a random pattern of dots, stripes, or the like. In addition, the surface protection film disclosed herein may be in roll form or in sheet form.

Figure 1:
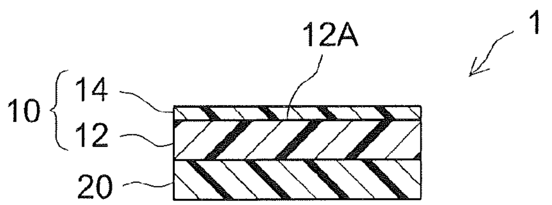
FIG. 1 is a cross sectional view showing an example of constitution of a surface protection film according to the present invention.
Figure 2:
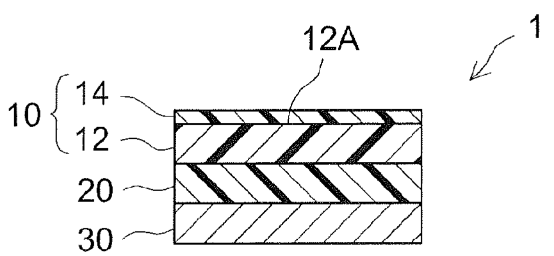
FIG. 2 is a cross sectional view showing another example of constitution of a surface protection film according to the present invention.

A typical example of constitution of a surface protection film having the transparent film disclosed herein as a support is shown schematically in FIG. 1. This surface protection film 1 is provided with a transparent film (support) 10 and a PSA layer 20. The transparent film 10 comprises a substrate layer 12 comprising a transparent resin film, and a back-face layer 14 having a thickness of 1 μm or less provided directly on a first face 12A thereof. The PSA layer 20 is provided on a surface among the transparent film 10 that is on the opposite side from the back-face layer 14. The surface protection film 1 is used by bonding this PSA layer 20 to an adherend (object to protect, for instance, the surface of an optical part such as a polarizer). Prior to use (that is to say, prior to bonding to the adherend), the protection film 1 may be of a morphology in which the surface of the PSA layer 20 (the face bonding to the adherend) is protected by a release liner 30, of which at least the PSA layer 20 side is a release face, typically as shown in FIG. 2. Alternatively, a morphology may be the surface protection film 1 wound in roll-form, causing the PSA layer 20 to be brought into contact with the back-face of the transparent film 10 (the surface of the back-face layer 14) and the surface thereof to be protected.

The substrate layer of the transparent film disclosed herein may be a resin film (substrate film) comprising various resin materials formed into the shape of a transparent film. Desirable as the resin materials are those that may constitute a substrate film having one, two or more properties which are excellent among transparency, mechanical strength, thermal stability, moisture-shielding properties, isotropy, and the like. For instance, a resin film constituted of a resin material having as a base resin (the main component among the resin components, that is to say, a component occupying 50% by mass or greater) a polyester polymer such as polyethylene terephthalate (PET), polyethylene naphthalate or polybutylene terephthalate, a cellulosic polymer such as diacetyl cellulose or triacetyl cellulose, a polycarbonate polymer, an acrylic polymer such as polymethyl methacrylate, or the like, can be used preferably as the substrate layer. As other examples of the resin material, those having as the base resin a styrene polymer such as polystyrene or acrylonitrile-styrene copolymer, an olefin polymer such as polyethylene, polypropylene, polyolefin having a cyclic or a norbornene structure, or ethylene-propylene copolymer, a polyvinyl chloride polymer, an amide polymer such as nylon 6, nylon 6,6 or aromatic polyamide, or the like, may be cited. As other examples of base resin, imide polymer, sulfone polymer, polyether sulfone polymer, polyether ether ketone polymer, polyphenylene sulfide polymer, vinyl alcohol polymer, vinylidene chloride polymer, vinyl butyral polymer, arylate polymer, polyoxy methylene polymer, epoxy polymer, and the like, may be cited. The substrate layer may comprise a blend of two or more species of the polymers described above. The less anisotropic the optical characteristics (such as phase contrast), the more desirable the substrate layer. In particular, with a transparent film used as a support from in surface protection film for optical parts, it is advantageous to decrease the optical difference of the substrate layer. The substrate layer may be a monolayer structure or a structure in which a plurality of layers of different compositions are layered. A monolayer structure is typical.

While the thickness of the substrate layer can be selected suitably according to the purpose, in general, on the order of 10 μm to 200 μm is adequate, on the order of 15 μm to 100 μm is desirable, and 20 μm to 70 μm is more desirable, from the balance of workability such as strength and handleability with cost, external appearance inspectability and the like.

For the refractive index of the substrate layer, in general, on the order of 1.43 to 1.6 is adequate, and on the order of 1.45 to 1.5 is desirable. In addition, from the point of view of substrate transparency, it is desirable that the substrate layer has a light transmittance of 70% to 99%, and 80% to 97% (for instance 85% to 95%) is more desirable for the transmittance.

As necessary, various additives such as oxidation inhibitor, ultraviolet-light absorbent, antistatic component, plasticizer, colorant (pigment, dye and the like) may be mixed in the resin material constituting the substrate layer. A well-known or commonly used surface treatment may have been performed on a first face of the substrate layer (the surface on the side where the back-face layer is to be provided), such as, for instance, corona discharge treatment, plasma treatment, ultraviolet radiation treatment, acid treatment, alkaline treatment or coating of an undercoat agent. Such a surface treatment may be, for instance, a treatment for increasing the adhesiveness between the substrate layer and the back-face layer. A surface treatment such that a polar group such as a hydroxyl group (—OH group) is introduced on the surface of the substrate layer may be preferably adopted. In addition, in the surface protection film disclosed herein, the transparent film constituting the surface protection film may have a surface treatment similar to the above performed on a second face of the substrate layer thereof (the surface on the side where the PSA layer is formed). Such a surface treatment may be a treatment for increasing the adhesiveness between the transparent film (support) and the PSA layer (anchoring ability of the PSA layer).

On one face (the first face) of the substrate layer, the transparent film disclosed herein has a back-face layer having a thickness of 1 μm or less (typically from 0.02 μm to 1 μm). The coefficient of friction of the back-face layer is preferably 0.4 or less (for example, 0.3 pr less). With this, when a load is applied to the back-face layer (load that may give rise to a scratch mark), the load along the surface of the back-face layer is repelled and the frictional force due to the load is alleviated. Thus, events that give rise to a scratch mark can be prevented, which are caused by the back-face layer failing cohesively or the back-face layer being peeled-off (failing interfacially) from the substrate layer, due to the frictional force. While the lower limit of the coefficient of friction is not limited in particular, considering the balance with other properties (printability, back-face peel strength, light transmittance and the like), in general, a coefficient of friction of 0.1 or greater (typically 0.1 or greater but 0.4 or less) is adequate and 0.2 or greater (typically 0.2 or greater but 3 or less) is desirable.

A value that is determined, for instance, by scratching the back-face of a transparent film (that is to say, the surface of the back-face layer) at a perpendicular load of 40 mN under a measurement environment of 23° C. and 50% RH can be adopted as the coefficient of friction (for a more concrete measurement method, refer to the Experimental Examples described below). As techniques for decreasing (adjusting) the coefficient of friction so that the above coefficient of friction is realized, the method of including various lubricants (leveling agent and the like) in the back-face layer, the method of adjusting the conditions for the addition of a crosslinking agent and for film formation to increase the crosslink density of the back-face layer, and the like, can be adopted suitably.

The transparent film disclosed herein is characterized by a percent change in coefficient of friction $\Delta\mu$ of less than 10%. This percent change in coefficient of friction $\Delta\mu$ is a value defined by $\Delta\mu=|\mu_{80}-\mu_{50}|/\min(\mu_{50},\mu_{80})$, using the coefficient of friction $\mu_{50}$ of the back-face layer after conserving the transparent film at 50° C. and 15% RH for three days, and the coefficient of friction $\mu_{80}$ of the back-face layer after conserving the transparent film at 80° C. and 80% RH for three days.

That is to say, the percent change in coefficient of friction $\Delta\mu$ is determined by dividing the absolute value $|\mu_{80}-\mu_{50}|$ of the difference between the above two coefficients of friction $\mu_{50}$ and $\mu_{80}$ by the smaller values among the coefficients of friction $\mu_{50}$ and $\mu_{80}$. A transparent film that meets $\Delta\mu<10\%$ (typically $0\%\leq\Delta\mu<10\%$) may exert resistance to scratch and printability at high levels stably, as the state of the back-face layer surface changes little over time. It is more desirable that $\Delta\mu$ is 6% or less (typically $0\%\leq\Delta\mu\leq6\%$) and even more desirable that $\Delta\mu$ is 5% or less (typically $0\%\leq\Delta\mu\leq5\%$).

In one preferred mode, at least one among $\mu_{50}$ and $\mu_{80}$ is 0.4 or less (typically 0.1 or greater but 0.4 or less, for instance, 0.2 or greater but 0.3 or less). It is more desirable that at least $\mu_{80}$ is 0.4 or less, and even more desirable that $\mu_{50}$ and $\mu_{80}$ both are 0.4 or less. A transparent film in which $\Delta\mu$ is in the above range and meets the above coefficient of friction, a higher resistance to scratch may be stably realized, along with a satisfactory printability.

According to the art disclosed herein, a transparent film provided with a back-face layer having a resistance to scratch at triangle (Δ) levels or greater (more preferably circle (○) levels) in the resistance to scratch evaluation described below and a PSA sheet comprising a PSA layer over the transparent film (typically, a surface protection film) may be provided. It is desirable that the transparent film and the PSA sheet demonstrate the above level of resistance to scratch also after being conserved at 50° C. and 15% RH for three days (resistance to scratch after conservation at 50° C.), and demonstrating the above level of resistance to scratch also after being conserved at 80° C. and 80% RH for three days (resistance to scratch after conservation at 80° C.) is even more desirable.

Printability in the art disclosed herein indicates the quality that printing can be performed readily with an oil-based ink (for instance, using an oil-based marking pen) and appropriately (for instance, with adequate print adhesiveness). In processes such as fabrication and transport of an adherend (for instance, an optical part) that use a surface protection film, there is the demand of wishing to write on the surface protection film and display the identification number, or the like, of the adherend subjected to protection. Consequently, a transparent film that excels also in printability in addition to resistance to scratch, and a surface protection film provided with the transparent film are desirable. For instance, high printability towards an oil-based ink of a type in which the solvent is of the alcohol series and containing a pigment is desirable. In addition, that the printed ink is difficult to remove by friction or transfer (that is to say, excellent print adhesiveness) is desirable.

The extent of the printability can be appreciated, for instance, by the printability evaluation described below. When the printability evaluation has been carried out for the back-face layer of a transparent film after being conserved at 50° C. and 15% RH for three days, it is desirable to have a print adhesiveness (print adhesiveness after conservation at 50° C. to an extent that at least 50% or greater (more preferably 75% or greater) of the print surface area remains without being peeled away. Also when the printability evaluation has been carried out for the back-face layer of a transparent film after being conserved at 80° C. and 80% RH for three days, similarly, it is more desirable to have a print adhesiveness (print adhesiveness after conservation at 80° C.) to an extent that 50% or greater (more preferably 75% or greater) of the print surface area remains without being peeled away. It is particularly desirable to have a print adhesiveness to an extent that 75% or greater of the print surface area remains without being peeled away both after conservation at 50° C. and after conservation at 80° C.

It is desirable for the back-face layer that the peel strength (back-face peel strength) is 2 N/19 mm or greater as measured by bonding a PSA tape to the back-face layer and peeling under the conditions of 0.3 m/minute peel speed and 180 degrees peel angle, and 3 N/19 mm or greater is more desirable. When applying the art disclosed herein to a surface protection film, having the peel strength described above is particularly of significance. If the peel strength is too low, the operation efficiency, when bonding a PSA tape to the release layer to remove the surface protection film from the adhered, sometimes tends to decrease. While the upper limit of the peel strength is not limited in particular, in general, 10 N/19 mm or less is desirable and, for instance, 7 N/19 mm or less is adequate, considering the balance with other properties (coefficient of friction and the like) and additionally, when unwinding the film after it was wound into a roll form, to prevent the event of a PSA attachment to the back-face thereof (adhesive residue). In one preferred mode of the art disclosed herein, the back-face peel strength is 2 N/19 mm to 10 N/19 mm (more preferably, 3 N/19 mm to 7 N/19 mm).

The peel strength is obtained, for instance, by using a one-sided PSA tape manufactured by Nitto Denko Corporation, product named "No. 31B", and measuring under an environment of 23° C. and 50% RH, under the conditions of 0.3 m/minute peel speed and 180 degrees peel angle (for a more concrete measurement method, refer to the Experimental Examples described below). When the peel strength measurement has been carried out for the back-face layer of a transparent film after being conserved at 50° C. and 15% RH for three days, it is desirable that the peel strength (peel strength after conservation at 50° C.) falls in the range of 2 N/19 mm to 10 N/19 mm (more preferably, 3 N/19 mm to 7 N/19 mm, for instance, 3 N/19 mm to 5 N/19 mm). Also when the peel strength measurement has been carried out for the back-face layer of a transparent film after being conserved at 80° C. and 80% RH for three days, similarly, it is desirable that the peel strength (peel strength after conservation at 80° C.) is in the range of 2 N/19 mm to 10 N/19 mm (more preferably 3 N/19 mm to 7 N/19 mm, for instance, 3 N/19 mm to 5 N/19 mm).

As the resins constituting the back-face layer, it is desirable to select resins allowing a layer having excellent resistance to scratch and having sufficient strength to be formed, and having excellent light transparency. Such resins may be various types of resin, such as, heat curing resin, ultraviolet-light curing resin, electron beam curing resin, and two-component mixing-type resin.

As concrete examples of heat curing resin, those having as the base resin a polysiloxane series, a polysilazane series, a polyurethane series, an acryl-urethane series, an acryl-styrene series, a fluorine resin series, an acryl silicone series, an acrylic, a polyester series, a polyolefin series, and the like, may be cited. Among these, heat curing resins such as of the polyurethane series, the acryl-urethane series and the acryl-styrene series are desirable on the points of having high elasticity and ease of forming a layer having excellent resistance to scratch. In addition, heat curing resins such as of the polysiloxane series and the polysilazane series are desirable on the point of ease of forming a layer having high hardness. In addition, heat curing resins of the fluorine resin series are desirable on the points of containing a lubricating component in the molecular structure and ease of forming a layer having the preferred coefficient of friction disclosed herein. Resins having a soft segment and a hard segment are desirable.

As the heat curing resins, resins having a soft segment and a hard segment are desirable. Here, a soft segment refers to a resin component having a flexible main chain structure or property, and a hard segment refers to a resin component having a rigid main chain structure or property (at least more rigid than the soft segment). The heat curing resins used in the formation of the back-face layer in the Samples A-1 to A-7 described below correspond to resins having a soft segment and a hard segment.

In addition, as the heat curing resins, resins in the form of an emulsion, in which the resin component is dispersed in an aqueous solvent, may be used preferably. In the above emulsion form, even with a resin component having a large molecular weight and a long main chain, the viscosity and the concentration can be adjusted readily by dispersion in the aqueous medium as an emulsion particle. Such resin components are suited to forming coating films that exhibit excellent resistance to scratch. Consequently, by adopting a resin (for instance, a heat curing resin) in emulsion form as a material of forming back-face layer according to the technology disclosed herein, a back-face layer demonstrating excellent resistance to scratch and printing properties may be realized adequately.

As concrete examples of ultraviolet-light curing resin, monomers, oligomers and polymers of various resins such as the polyester series, acrylic series, urethane series, amide series, silicone series and epoxy series, and mixtures thereof, may be cited. From the favorable ultraviolet-light curability and the ease of forming a layer with a high degree of hardness, an ultraviolet-light curing resin containing multi-functional monomers having two or more ultraviolet-light polymerizable functional groups (more preferably, three or more, for instance on the order of three to six) within one molecule, and/or oligomers thereof, may be adopted preferably. Acrylic monomers such as multi-functional acrylates and multi-functional methacrylates can be used preferably as the multi-functional monomers. From the point of view of adhesiveness to the substrate layer, it is more advantageous to use heat curing resins than ultraviolet-light curing resins.

The thickness of the back-face layer can be, for instance, close to 0.02 μm to 1 μm, and preferably close to 0.05 μm to 0.5 μm (for instance, 0.05 μm to 0.2 μm). If the thickness of the back-face layer is too large, the quality level of the external appearance, such as coloration and curling, sometimes become prone to decreasing due to the back-face layer. If the thickness of the back-face layer is too small, the desired resistance to scratch becomes difficult to realize. The thickness of the transparent film disclosed herein or of the layer constituting the surface film (for instance the back-face layer) can be appreciated by the technique of observing a at high resolution with a transmission electron microscopy (TEM), or the like, a sample obtained by pre-staining the back-face layer with heavy-metal, then, cutting this transparent film in the cross-sectional direction and surface-shaping. This technique may be applied preferably to layer having a thickness of close to 0.01 μm or greater. Regarding thinner layers, the approximate thickness thereof can be computed by constructing a calibration curve and performing calculations based on the correlation between various thickness detectors (for example, surface roughness meter, interferometric thickness gauge, infrared spectrometer, various X-ray diffractometers, and the like) and the thicknesses appreciated by electron microscope observations. In addition, using TEM sometimes also allows the layer constitution to be observed in the cross-sectional direction (the number layers in a layered structure and the thickness of each layer). In addition, when all the layers have a thickness of close to 0.1 μm or greater each, the layer constitution can also be investigated with an interferometric thickness gauge.

The back-face layer in the art disclosed herein, as necessary, can contain an additive such as a lubricant (leveling agent or the like), an antistatic component, a crosslinking agent, an oxidation inhibitor, a colorant (pigment, dye or the like), a fluidity adjuster (a thixotropic agent, a tackifier or the like), a film-formation helper or a catalyst (for instance, an ultraviolet-light polymerization initiator in a composition containing an ultraviolet-light curing resin). As crosslinking agents, generic crosslinking agents used in resin crosslinking such as of the isocyanate series, the epoxy series or the melamine series can be suitably selected and used. Given that adhesiveness may be improved by bonding with a hydroxyl group that may be present on the surface of the substrate layer, a crosslinking agent of the isocyanate series, for instance, may be adopted preferably. In particular, when the back-face layer is to be formed on a substrate layer that has been subjected to such a surface treatment whereby hydroxyl groups are introduced (for instance, a corona treatment), the use of an isocyanate series crosslinking agent is effective.

The back-face layer may be formed suitably by a technique comprising giving the substrate layer a liquid composition comprising the resin component and the additive to be used as necessary, dispersed or dissolved in an adequate solvent. For instance, the technique of coating the liquid composition (composition for back-face layer formation) to the substrate layer, drying, and as necessary carry out a curing treatment (heat treatment ultraviolet-light treatment or the like), may be preferably adopted. The solid content of the composition can be, for instance on the order of 0.1% by mass to 10% by mass, and in general on the order of 0.5% by mass to 5% by mass is adequate. If the solid content too high, forming a thin and uniform back-face layer becomes sometimes difficult.

The solvent constituting the composition for back-face layer formation may be an organic solvent, water or a mixed solvent thereof. As the organic solvent, for instance, one, two or more species selected from methyl ethyl ketone, acetone, ethyl acetate, tetrahydrofuran (THF), dioxane, cyclohexanone, n-hexane, toluene, xylene, methanol, ethanol, n-propanol, isopropanol, and the like, can be used. In the art disclosed herein, it is desirable that the solvent constituting the composition for back-face layer formation is an aqueous solvent, from the point of view of alleviating the environmental burden or the like. Here "aqueous solvent" refers to water or a mixed solvent having water as the main component (component occupying 50% by volume or greater). A hydrophilic solvent is preferably used as component other than water constituting such an aqueous mixed solvent. For instance, one, two or more species selected from alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl 1-propanol, 2-methyl 1-butanol, n-hexanol and cyclohexanol can be preferably adopted.

When including a lubricant in the back-face layer, an appropriate lubricant for realizing the preferred percent change in coefficient of friction Δμ disclosed herein can be selected suitably and used as this lubricant. As lubricants that may be adopted preferably, reactive lubricants, block or graft copolymer-type lubricants, modified silicone lubricants, and the like, may be cited.

As the reactive lubricants, for instance, those having a reactive functional group such as an amino group, a hydroxyl group (meaning including phenolic hydroxyl groups), an epoxy group (for instance, glycidyl group), an alkoxy group, an acryloyl group, a silanol group or a carboxyl group can be used. A silicone polymer, a fluorine-containing polymer, or the like, modified with one, two or more species of such reactive functional groups (in other words, with the reactive groups introduced into) can be preferably adopted as reactive lubricants in the art disclosed herein. In addition to the reactive functional groups, the silicone polymer, the fluorine-containing polymer, or the like, may be modified with another functional group (for instance, polyether-modified). As a typical example of the silicone polymer, polydimethylsiloxane may be cited. A reactive lubricant having a reactive functional group capable of forming a crosslink structure with the base resin constituting the back-face layer can be preferably selected. In addition, if a surface treatment (corona treatment or the like) has been performed such that a polar group (for instance hydroxyl group) has been introduced on the surface of the substrate layer, a reactive lubricant having a reactive functional group capable of forming a crosslink structure with the polar group can be preferably selected. According to such reactive lubricants, since the reactive functional group bonds to the base resin of the back-face layer or a polar group on the substrate layer surface, the movement of the lubricant over time is suppressed, and the preferred percent change in coefficient of friction $\Delta\mu$ disclosed herein may be realized adequately. As commercially available products, epoxy-modified silicone oils manufactured by Dow Corning Toray Co. Ltd., product named "SF8421", idem "SF8413", amino group-modified silicone oil manufactured by same, product named "BY16-872", polyether-modified hydroxyl group-containing polydimethylsiloxanes manufactured by BYK Chemie, product named "BYK377", carboxyl group-containing type of acryl silicone comb graft polymer manufactured by Toagosei Co., Ltd., product named "US-350", idem "US-380", idem hydroxyl group-containing type, product named "US-270", and the like, can be preferably used.

As the block or graft copolymer-type lubricants, for instance, block copolymers, graft copolymers, or the like, having a low polarity segment such as a silicone segment or a fluorine-containing segment, and a segment exhibiting a high affinity (compatibility) towards the resin material constituting the substrate layer or the base resin constituting the back-face layer (hereafter also referred to a "compatible segment") can be used. The species of the compatible segment may be selected suitably according to the material of the back-face layer or the substrate layer. For instance, one in which the compatible segment having a reactive crosslinking group such as a hydroxyl group can be preferably used. According to a lubricant having such a structure, since the low polarity segment bleeds (becomes unevenly distributed) to the surface of the back-face layer and exhibits a slipperiness improving effect while the compatible segment having a high affinity for the back-face layer or the substrate layer surface demonstrates an anchoring effect whereby the movement of the lubricant over time may be suppressed, the preferred percent change in coefficient of friction $\Delta\mu$ disclosed herein may be realized adequately. As commercially available products, block co-polymers manufactured by manufactured by Nippon Oil & Fats Co., Ltd., the product named "MODIPER FS710", idem "F200", idem "FS720", idem "F3035", and the like, can be preferably used.

As representative examples of the modified silicone lubricant (typically non-reactive lubricant), those having a structure comprising, at least for a portion of the repeating units ($-Si(CH_3)_2-O-$) in polydimethylsiloxane, one of the methyl groups within the repeating unit substituted with another functional group, may be cited. For instance, those in which the functional group substituting the methyl group is (a). an alkyl group having two or more carbons (for instance, a long-chain alkyl group) (polymethylalkylsiloxanes), (b). a group having an aromatic ring such as an aryl group, an aralkyl group, or the like, (c). a polyester chain (polyester-modified polydimethylsiloxanes), (d). a higher fatty acid, (e). a polyether chain (polyether-modified polydimethylsiloxanes), and the like, can be adopted suitably. As modified silicone lubricants that may be used preferably, modified silicone lubricants corresponding to any of the above (a) to (c) (more preferably the above (b) or (c)) may be cited. As commercially available products, the product named "XF42-A3161" manufactured by Momentive Performance Materials Inc., idem "XF42-334", idem "XF42-B3629", idem "TSF4421", idem "TSF4420", and the like, can be preferably used. It is desirable to use a silicone lubricant that is not polyether-modified and has adequate heat resistance.

The lubricants to be included in the back-face layer are not limited to those described above, and various lubricants can be used as long as the preferred percent change in coefficient of friction $\Delta\mu$ disclosed herein may be realized. Of such lubricants, one species may be used alone, or two or more species may be used in combination.

The amount of lubricant added can be close to 10 parts by mass or less (typically 0.01 parts by mass to 10 parts by mass) per 100 parts by mass of the resin component constituting the back-face layer, and in general close to 7 parts by mass or less (typically 0.02 parts by mass to 7 parts by mass) is desirable. If the amount of lubricant added is excessive, the percent change in coefficient of friction $\Delta\mu$ may become too large, printability may tend to be insufficient, and the light transparency of the back-face layer may show a decreasing trend.

It is inferred that such a lubricant bleeds on the surface of the back-face layer, giving slipperiness to the surface, thereby decreasing the coefficient of friction. Consequently, by an appropriate use of the lubricant (in particular, selection of species and setting of mixing amount so as to meet percent change in coefficient of friction $\Delta\mu<10\%$), allows the resistance to scratch to be improved and printability ensured through the decrease of the coefficient of friction. The lubricant may also contribute to decreasing thickness irregularities and attenuating interference fringes by uniformizing the surface tension of the back-face layer. This is particularly of significance in a surface protection film for an optical member. In addition, in a case where the resin component constituting the back-face layer is an ultraviolet-light curing resin, if a lubricant of the fluorine series or the silicone series is added thereto, when a composition for back-face layer formation is coated onto a substrate and dried, the lubricant bleeds on the surface of the coating film (the boundary surface with air), which suppresses the inhibition by oxygen of the curing during ultraviolet irradiation, allowing the ultraviolet-light curing resin to be cured sufficiently also at the outermost surface of the back-face layer.

The antistatic component is a component having the action of preventing electric charging of the transparent film or the surface protection film using the film. When including an antistatic component in the back-face layer, for instance, organic or inorganic electrically conductive substances, various antistatic agents, and the like, can be used as this antistatic component. Among them, the use of an organic electrically conductive substance is desirable. A transparent film provided with a back-face layer that has been given antistatic properties by including such an antistatic component is suitable as a surface protection film used in a fabrication or transport process, or the like, of products that dislike static electricity, such as, liquid crystal cells, semiconductor devices, and the like.

Various electrically conductive polymers can be preferably used as the organic electrically conductive substance. As examples of such electrically conductive polymers, polyaniline, polypyrrole, polythiophene, polyethylene imine, allylamine polymer, and the like, may be cited. Of such electrically conductive polymers, one species may be used alone, or two or more species may be used in combination. In addition, they may be used in combination with another antistatic component (inorganic electrically conductive substance, antistatic agent or the like). The amount of organic electrically conductive substance used (typically, electrically conductive polymer) can be for instance on the order of 0.2 parts by mass to 20 parts by mass with respect to 100 parts by mass of the resin component constituting the back-face layer, and in general on the order of 1 part by mass to 10 parts by mass is adequate.

As such electrically conductive polymers, those in the form of an aqueous solution or a water dispersion solution may be preferably used. For instance, by dissolving or dispersing in water an electrically conductive polymer having a hydrophilic functional group (may be synthesized by a technique such as copolymerizing a monomer having a hydrophilic functional group within the molecule), an aqueous solution or a water dispersion solution of the electrically conductive polymer can be prepared. Illustrative of the hydrophilic functional group are the sulfo group, the amino group, the amido group, the imino group, the hydroxyl group, the mercapto group, the hydrazino group, the carboxyl group, the quaternary ammonium group, the sulfate ester group (—O—$SO_3H$), the phosphoester group (for instance —O—$PO(OH)_2$), and the like. Such hydrophilic functional groups may form salts. As an example of commercial product of polyaniline sulfonic acid in the form of an aqueous solution or a water dispersion solution, the product named “aqua-PASS”, manufactured by Mitsubishi Rayon Co., Ltd., may be cited. In addition, as an example of commercial product of polythiophene in the form of an aqueous solution or a water dispersion solution, the product named “Denatron” series, manufactured by Nagase ChemteX Corporation, may be cited.

Illustrative of the electrically conductive polymers that may be preferably adopted in the art disclosed herein are polyanilines and polythiophenes. Polyanilines having a weight average molecular weight calculated as polystyrene (hereinafter noted “Mw”) of $50\times10^4$ or less are desirable, and $30\times10^4$ or less is more desirable. Polythiophenes having a Mw of $40\times10^4$ or less are desirable, and $30\times10^4$ or less is more desirable. In addition, it is desirable that the Mws of these electrically conductive polymers are in general $0.1\times10^4$ or greater, and more preferably $0.5\times10^4$ or greater. Electrically conductive polymers having such Mws are also desirable from the point of ease of preparation in the form of an aqueous solution or a water dispersion solution.

As the inorganic electrically conductive substances, microparticles comprising, for instance, tin oxide, antimony oxide, indium oxide, cadmium oxide, titanium oxide, zinc oxide, indium, tin, antimony, gold, silver, copper, aluminum, nickel, chromium, titanium, iron, cobalt, copper iodide, and alloys or mixtures thereof, can be used. Microparticles such as of ITO (indium oxide/tin oxide) and ATO (antimony oxide/tin oxide) may be used. It is desirable that the average particle size of the microparticle is, in general, roughly 0.1 μm or less (typically 0.01 μm to 0.1 μm). Of such inorganic electrically conductive substances (inorganic electric conducting materials), one species may be used alone, or two or more species may be used in combination. In addition, they may be used in combination with another antistatic component. the amount of inorganic electrically conductive substance used can be for instance on the order of 5 parts by mass to 500 parts by mass with respect to 100 parts by mass of the resin component constituting the back-face layer, and in general, on the order of 10 parts by mass to 500 parts by mass (for instance, 100 parts by mass to 500 parts by mass) is adequate.

As examples of the antistatic agent, cationic antistatic agents, anionic antistatic agents, amphoteric antistatic agents, non-ionic antistatic agents, ion-conductive polymers obtained by polymerizing or copolymerizing monomers having the above cationic, anionic or amphoteric ion-conductive group, and the like, may be cited. Of such antistatic agents, one species may be used alone, or two or more species may be used in combination. In addition, they may be used in combination with another antistatic component. The amount of antistatic agent uses can be, for instance, close to 0.5 parts by mass to 50 parts by mass with respect to 100 parts by mass of the resin component constituting the back-face layer, and in general 1 part by mass to 30 parts by mass is adequate.

As examples of cationic antistatic agent, those containing a cationic functional group such as a quaternary ammonium salt, a pyridinium salt, or a primary, a secondary or a tertiary amino group, may be cited. More concretely: acrylic copolymers having a quaternary ammonium group such as alkyl trimethylammonium salt, acyloyl amidopropyl trimethylammonium methosulfate, alkylbenzyl methyl ammonium salt, acylcholine chloride or polydimethylaminoethyl methacrylate; styrene copolymers having a quaternary ammonium group such as polyvinyl benzyl trimethylammonium chloride; diallylamine copolymers having a quaternary ammonium group such as polydiallyl dimethylammonium chloride; and the like, are illustrative.

As examples of anionic antistatic agent, those containing an anionic functional group such as sulfonate, sulfate ester salt, phosphonate or phosphoester salt may be cited. More concretely, alkyl sulfonate, alkyl benzene sulfonate, alkyl sulfate ester salt, alkyl ethoxysulfate ester salt, alkyl phosphoester salt, sulfonic acid group-containing styrene copolymers, and the like, are illustrative.

As examples of amphoteric antistatic agent, alkyl betaine and derivatives thereof, imidazoline and derivatives thereof, and alanine and derivatives thereof, may be cited. More concretely, alkyl betaine, alkyl imidazolium betaine, carbobetaine graft copolymer, and the like, are illustrative.

As examples of non-ionic antistatic agent, amino alcohol and derivatives thereof, glycerin and derivatives thereof, and polyethylene glycol and derivatives thereof may be cited. More concretely, fatty acid alkylol amide, di(2-hydroxyethyl) alkyl amine, polyoxyethylene alkyl amine, glycerin fatty acid ester, polyoxyethylene glycol fatty acid ester, sorbitan fatty acid ester, polyoxysorbitan fatty acid ester, polyoxyethylene alkylphenyl ether, polyoxyethylene alkyl ether, polyethylene glycol, polyoxyethylene diamine, copolymer comprising polyether, polyester and polyimide, methoxy polyethylene glycol (meth)acrylate, and the like, are illustrative.

As methods for giving antistatic properties to a transparent film, alternatively to the method of including an antistatic component in the back-face layer as described above, or in addition to the method, the method of including an antistatic component in the substrate layer, the method of providing an antistatic layer on the first face and/or the second face of the substrate layer, and the like, can be adopted.

The method of including an antistatic component in the substrate layer may be preferably carried out, for instance, by forming a resin material in which an antistatic component is mixed (kneaded-in) into the shape of a film to constitute the substrate layer. As antistatic components used in such a method, the same materials as those illustrated above as antistatic components to be included in the back-face layer, or the like, can be adopted. The mixing amount of such antistatic components can be, for instance, close to 20% by mass or less (typically 0.05% by mass to 20% by mass) with respect to the total mass of the substrate layer, and in general, a range of 0.05% by mass to 10% by mass is adequate. As methods for kneading-in the antistatic component, there is no particular limitation as long as they are methods that can homogeneously mix the antistatic agent into the resin material for substrate layer formation and, for instance, kneading methods that use a heat roll, a Banbury mixer, a pressurized kneader, a biaxial kneader, or the like, may be cited.

The method of providing an antistatic layer on the first face (on the back-face side, that is to say, between the substrate layer and the back-face layer) and/or the second face (on the PSA layer side) of the substrate layer may be preferably carried out by coating the substrate layer (preferably, a preformed resin film) with a coating agent for static charge prevention containing an antistatic component and a resin component to be used as necessary. As the antistatic components, the same materials as those illustrated above as antistatic components to be included in the back-face layer, or the like, can be adopted. The use of an electrically conductive polymer or an antistatic agent is desirable. As the resin component used in the coating agent for static charge prevention, for instance, general-purpose resins such as polyester resin, acrylic resin, polyvinyl resin, urethane resin, melamine resin and epoxy resin can be used. In addition, the coating agent for static charge prevention may contain as a crosslinking agent for the resin component, a compound of the methylolated or alkylolated melamine series, the urea series, the glyoxal series or the acrylamide series, an epoxide compound, an isocyanate series compound or the like. In the case of a high molecular weight-type antistatic component (typically, electrically conductive polymer) the use of the resin component may be omitted.

As methods for coating the coating agent for static charge prevention, well-known coating method can be used suitably. As concrete examples, roll-coating method, gravure-coating method, reverse-coating method, roll-brush method, spray-coating method, air-knife coating method, impregnation method and curtain-coating method may be cited. For the thickness of the antistatic layer, in general, close to 0.01 μm to 1 μm is adequate, and on the order of close to 0.015 μm to 0.1 μm is desirable.

In one preferred mode of the art disclosed herein, the back-face layer is provided directly on the first face of the substrate layer. Given the excellent adhesiveness between the substrate layer and the back-face layer, a transparent film of such a constitution is desirable since it is likely to have an excellent resistance to scratch. Consequently, when providing the antistatic layer on the surface of the substrate layer, it is desirable to provide the antistatic layer only on the second face of the substrate layer.

As the PSA layer constituting the surface protection film disclosed herein, one can be formed suitably by using a PSA composition allows a PSA layer to be formed, provided with qualities that are suited to the surface protection film (peel strength, non-contaminability and the like, with respect to the adherend surface). For instance, the method of providing such a PSA composition directly to the substrate layer and drying or curing to form a PSA layer (direct method), the method of providing a PSA composition on the surface of a release liner (release face) and drying or curing to form a PSA layer on the surface, and bonding this PSA layer matchingly to the substrate layer to transfer the PSA layer onto the substrate layer (transfer method), and the like, can be adopted. From the point of view of the anchoring ability of the PSA layer, in general, the direct method may be adopted preferably. When providing (typically, coating) the PSA composition, various methods conventionally well-known in the field of PSA sheet can be adopted suitably, such as, the roll-coating method, the gravure-coating method, the reverse-coating method, the roll-brush method, the spray-coating method, the air-knife coating method, and the method of coating with a die coater. Although not to be limited in particular, the thickness of the PSA layer can be, for instance, on the order of close to 3 μm to 100 μm, and in general, on the order of close to 5 μm to 50 μm is desirable. As methods for obtaining the surface protection film disclosed herein, either of the method of forming the PSA layer on a substrate layer (that is to say a transparent film) provided beforehand with a back-face layer, and the method of forming the back-face layer after providing a PSA layer on the substrate layer, can be adopted. In general, the method of providing a PSA layer to the transparent film is desirable.

With the purpose of protecting the PSA face (the face on the side of the PSA layer that is to be bonded to the adherend), the surface protection film disclosed herein may be supplied, as necessary, in a form comprising a release liner bonded matchingly onto the PSA face (in the form of a surface protection film with a release liner). As substrates constituting the release liner, papers, synthetic resin films, and the like, can be used; from the point of excellent surface smoothness, synthetic resin films are used suitably. For instance, a resin film comprising the same resin material as the substrate layer can be used preferably as the substrate of the release liner. The thickness of the release liner can be, for instance, close to 5 μm to 200 μm, and in general, on the order of close to 10 μm to 100 μm is desirable. A parting or anti-soiling treatment may be performed on the face of the release liner to be bonded matchingly to the PSA layer, using a conventionally well-known parting agent (for instance, of the silicone series, the fluorine series, the long chain alkyl series, the fatty acid amide series or the like), silica powder, or the like.

While a number of experimental examples related to the present invention will be described below, the present invention is not intended to be limited to what is indicated in such concrete examples. In the descriptions below, "parts" and "%" are mass-based, unless explicitly stated otherwise. In addition, the properties in the descriptions below were respectively measured or evaluated in the following manner.

1. Coefficient of Friction

Nano-Scratch Tester manufactured by CSM Instruments SA was used as the device for measuring the coefficient of friction. The PSA face of each surface protection film sample was bonded to a slide glass and the sample was immobilized on the stage of the measurement device so that the back-face layer was facing up. Then, under a measurement environment of 23° C. and 50% RH, using a cantilever ST-150 equipped with a conical diamond indenter (tip curvature radius: 10 μm), in the constant load mode of the device (perpendicular load: 40 mN±3 mN), the surface (on the back-face layer side) of each sample was scratched over a length of 5 mm, and the mean value of the coefficient of friction at this time served as the coefficient of friction of the back-face layer. The coefficient of friction is calculated as the ratio between the frictional force and the load in the perpendicular direction to the sample surface (that is to say, coefficient of friction=frictional force/load).

For each surface protection film sample, one sample was cut into halves approximately from the center, of which one was placed in a thermostated and humidistated dryer at 50° C. and 15% RH, the other in a thermostated and humidistated dryer at 80° C. and 80% RH, and respectively conserved for three days. The coefficient of friction was measured by the above method for the samples after conservation under these two conditions. These results are indicated in Table 1, with "$\mu_{50}$" as the coefficient of friction of the sample conserved at 50° C. and "$\mu_{\lambda}$" as the coefficient of friction of the sample conserved at 80° C.

2. Percent Change in Coefficient of Friction

The coefficients of friction $\mu_{50}$ and $\mu_{80}$ obtained above in 1. were substituted in the following formula to calculate the percent change in coefficient of friction $\Delta\mu$ for each surface protection film sample: $\Delta\mu=|\mu_{80}-\mu_{50}|/\min(\mu_{50},\mu_{80})$.

3. Peel Strength Measurement

Each surface protection film sample was conserved at 50° C. and 15% RH for three days, then, cut to a size of 70 mm in width and 100 mm in length to serve as an adherend. A one-sided PSA tape (No. 31B, manufactured by Nitto Denko Corporation) was cut to a size of 19 mm in width and 100 mm in length, and the PSA face of the PSA tape was pressure-bonded on the back-face layer of the adherend at a pressure of 0.25 MPa and a speed of 0.3 m/minute. This was left under an environment of 23° C. and 50% RH for 30 minutes, then, under the same environment, using a universal tensile tester, the PSA tape was peeled-off from the adherend under the conditions of 0.3 m/minute peel speed and 180 degrees peel angle, and the peel strength at this time was measured. In addition, each surface protection film sample was conserved at 80° C. and 80% RH for three days, and then, the peel strength was measured similarly. The obtained measurement values are shown in Table 2.

4. Resistance to Scratch Evaluation

Each surface protection film sample was conserved at 50° C. and 15% RH for three days, then, bonded to a slide glass in a similar manner to above, and each sample was scratched at a load of 300 g on a precision balance using the edge of a coin (a new 10-yen coin was used) under a measurement environment of 23° C. and 50% RH. This scratch trace was observed with a light microscope, and the evaluation was cross (x) when the presence of falling debris from the back-face layer was observed (the resistance to scratch does not reach a level that enables practical use), triangle (Δ) when a slight scratch mark was observed but no presence of falling debris was observed (has a resistance to scratch of a level that enables practical use), and circle (○) when no falling debris and no scratch mark were observed (has a high resistance to scratch). In addition, each surface protection film sample was conserved at 80° C. and 80% RH for three days, and then, the resistance to scratch was measured similarly. The obtained measurement values are shown in Table 2.

5. Printability (Print Adhesiveness) Evaluation

Each surface protection film sample was conserved at 50° C. and 15% RH for three days, then, printing was performed on the back-face layer using Xstamper manufactured by Shachihata Inc, under an environment of 23° C. and 50% RH. Next, from above this print, a cellophane PSA tape manufactured by Nichiban Co., Ltd. (product No. 405, 19 mm in width) was bonded and then peeled-off under the conditions of 30 m/minute peel speed and 180 degrees peel angle. The evaluation was cross (x) when 50% or more of the print surface area was peeled away, triangle (Δ) when more than 25% but less than 50% of the print surface area was peeled away, and circle (○) when 75% or more of the print surface area remained without being peeled away, by visual evaluation. In addition, each surface protection film sample was conserved at 80° C. and 80% RH for three days, and then, the print adhesiveness was measured similarly. The obtained measurement values are shown in Table 2

Experimental Example 1

Sample A-1

A urethane acrylate heat curing resin (manufactured by DIC Corporation, product named "ACRYDIC A-814"; hereafter, may also be noted "Resin R1") and, as a lubricant, alkyl-modified polydimethylsiloxane (modified silicone oil manufactured by Momentive Performance Materials Inc., product named "XF42-A3161"; hereafter, may also be noted "Lubricant L1") were mixed so that the solid content mass ratio was 100:3, and diluted with a solvent having toluene as the main component to prepare a Coating Solution (composition for back-face layer formation) B-1 with a solid content concentration of 0.8%.

A 38 μm-thick transparent polyethylene terephthalate (PET) film (hereafter, may also be noted "Substrate F1") corona-treated on a first face was used as a substrate. To the Coating Solution B-1, 30 parts of a curing agent (a polyisocyanate compound manufactured by DIC Corporation, product named "DN-980") with respect to 100 parts of solid contents in Resin R1 was mixed, this was coated on the first face of the Substrate F1 (the corona-treated face), and heat-cured. In this way, a Transparent Film C-1 provided with a back-face layer on the first face of the Substrate F1 (the corona-treated face) was obtained.

A parting sheet was prepared, comprising a PET film release-treated on a first face with a silicone release treatment agent, and a 25 μm-thick acrylic PSA layer was formed on the release face of the parting sheet (the release-treated face). This PSA layer was transferred onto a second face of the Transparent Film C-1 (the face provided with no back-face layer) to prepare a surface protection film Sample A-1. The PET film used here had a refractive index of 1.63 and a light transmittance of 89%.

Sample A-2

Except the point that the amount of Lubricant L1 used was 5 parts (calculated as solid contents) per 100 parts of solid contents in Resin R1, a Coating Solution B-2 with a solid content concentration of 0.8% was prepared in a similar manner to the preparation of the Coating Solution B-1. Except the point that this Coating Solution B-2 was used, a Transparent Film C-2 was obtained in a similar manner to the preparation of the Sample A-1, and similarly, a PSA layer was transferred to prepare a surface protection film Sample A-2.

Sample A-3

In the present example, instead of the Lubricant L1 in Sample A-1, a block co-polymer having a silicone segment (silicone series block co-polymer manufactured by Nippon Oil & Fats Co., Ltd., product named "MODIPER FS710"; hereafter, may also be noted "Lubricant L2") was used. The Resin R1 and the Lubricant L2 were mixed so that the solid content mass ratio was 100:3, and diluted with a solvent having toluene as the main component to prepare a Coating Solution B-3 with a solid content concentration of 0.4%. Except the point that this Coating Solution B-3 was used, a Transparent Film C-3 was obtained in a similar manner to the preparation of the Sample A-1, and similarly, a PSA layer was transferred to prepare a surface protection film Sample A-3.

Sample A-4

In the present example, instead of the Lubricant L1 in Sample A-1, reactive silicone having a structure comprising a glycidyl-type epoxy group and a polyether chain introduced into polydimethyl siloxane (epoxy-modified silicone oil manufactured by Dow Corning Toray Co., Ltd., product named "SF8421"; hereafter, may also be noted "Lubricant L3") was used. The Resin R1 and the Lubricant L3 were mixed so that the solid content mass ratio was 100:3, and diluted with a solvent having toluene as the main component to prepare a Coating Solution B-4 with a solid content concentration of 0.8%. Except the point that this Coating Solution B-4 was used, a Transparent Film C-4 was obtained in a similar manner to the preparation of the Sample A-1, and similarly, a PSA layer was transferred to prepare a surface protection film Sample A-4.

Sample A-5

In the present example, instead of the Lubricant L1 in Sample A-1, block co-polymer having a fluorine-containing segment (fluorine series block co-polymer manufactured by Nippon Oil & Fats Co., Ltd., product named "MODIPER F200"; hereafter, may also be noted "Lubricant L4") was used. The Resin R1 and the Lubricant L4 were mixed so that the solid content mass ratio was 100:3, and diluted with a solvent having toluene as the main component to prepare a Coating Solution B-5 with a solid content concentration of 0.4%. Except the point that this Coating Solution B-5 was used, a Transparent Film C-5 was obtained in a similar manner to the preparation of the Sample A-1, and similarly, a PSA layer was transferred to prepare a surface protection film Sample A-5.

Sample A-6

In the present example, instead of the Lubricant L1 in Sample A-1, polyether-modified polydimethylsiloxane (polyether-modified polydimethylsiloxane leveling agent manufactured by BYK Chemie, product named "BYK-333"; hereafter, may also be noted "Lubricant L5") was used. The Resin R1 and the Lubricant L5 were mixed so that the solid content mass ratio was 100:3, and diluted with a solvent having toluene as the main component to prepare a Coating Solution B-6 with a solid content concentration of 0.8%. Except the point that this Coating Solution B-6 was used, a Transparent Film C-6 was obtained in a similar manner to the preparation of the Sample A-1, and similarly, a PSA layer was transferred to prepare a surface protection film Sample A-6.

Sample A-7

Except the point that the amount of Lubricant L5 used was 5 parts (calculated as solid contents) per 100 parts of solid contents in Resin R1, a Coating Solution B-7 with a solid content concentration of 0.4% in a similar manner to the preparation of the Coating Solution B-6. Except the point that this Coating Solution B-7 was used, a Transparent Film C-7 was obtained in a similar manner to the preparation of the Sample A-1, and similarly, a PSA layer was transferred to prepare a surface protection film Sample A-7.

For the above samples, a summary of the constitution of the back-face layer and the results of the various measurements and evaluations described above are shown in Tables 1 and 2. For a transparent film prepared similarly with a back-face layer composition containing no lubricant, the coefficient of friction of the back-face layer after being conserved at 50° C. and 15% RH for three days was 0.42.

TABLE 1

| | Lubricant | | Coefficient of friction | | |
|---|---|---|---|---|---|
| Sample | Species | Amount added (parts) | $\mu_{50}$ | $\mu_{80}$ | Percent change $\Delta\mu(\%)$ |
| A-1 | L1 | 3 | 0.39 | 0.36 | 9.2 |
| A-2 | L1 | 5 | 0.30 | 0.29 | 5.3 |
| A-3 | L2 | 3 | 0.25 | 0.25 | 1.6 |
| A-4 | L3 | 3 | 0.28 | 0.26 | 5.7 |
| A-5 | L4 | 3 | 0.28 | 0.26 | 4.6 |
| A-6 | L5 | 3 | 0.39 | 0.45 | 15.4 |
| A-7 | L5 | 5 | 0.31 | 0.22 | 40.6 |

TABLE 2

| | Resistance to scratch | | Print adhesiveness | | Peel strength (N/19 mm) | |
|---|---|---|---|---|---|---|
| Sample | After conservation at 50° C. | After conservation at 80° C. | After conservation at 50° C. | After conservation at 80° C. | After conservation at 50° C. | After conservation at 80° C. |
| A-1 | Δ | Δ | ○ | ○ | 6.7 | 5.6 |
| A-2 | ○ | ○ | ○ | ○ | 4.5 | 4.3 |
| A-3 | ○ | ○ | ○ | ○ | 5.5 | 5.9 |
| A-4 | ○ | ○ | ○ | ○ | 4.7 | 4.9 |
| A-5 | ○ | ○ | ○ | ○ | 4.8 | 4.6 |
| A-6 | Δ | x | ○ | ○ | 4.3 | 5.6 |
| A-7 | ○ | ○ | Δ | x | 3.2 | 1.8 |

As shown in these tables, according to the Samples A-1 to A-5 in which the percent change in coefficient of friction Δμ was less than 10%, it was observed that resistance to scratch at practically usable levels or greater and satisfactory print adhesiveness could both be established. According to the Samples A-2 to A-5 in which the percent change in coefficient of friction Δμ was 6% or less, particularly satisfactory results were obtained. In addition, these samples all had appropriate peel strengths, and were suited to peeling operation using a PSA tape.

Meanwhile, with Sample A-6 in which the percent change in coefficient of friction Δμ was 10% or greater, although the resistance to scratch after conservation at 50° C. was at practically usable levels, the resistance to scratch after conservation at 80° C. was lacking. In addition, coefficient of friction $\mu_{80}$ after conservation at 80° C. exceeded 0.4 and increased. With the Sample A-7 in which the amount of Lubricant L5 was increased in an attempt to hold down the coefficient of friction $\mu_{80}$ to 0.4 or less, the percent change in coefficient of friction Δμ increased even more, and while the resistance to scratch improved, print adhesiveness was insufficient. In addition, the peel strength after conservation decreased noticeably, and the sample was not suited to peeling operation using a PSA tape.

INDUSTRIAL APPLICABILITY

The transparent film disclosed herein may be used preferably in an application such as a support in various surface protection films. In addition, during fabrication or during transport, or the like, of an optical member used as a structural component of a liquid crystal display panel, a plasma display panel (PDP), an organic electro-luminescence (EL) display, or the like, the surface protection film disclosed herein is suitable to an application for protecting the optical member. In particular, it is useful as a surface protection film applied to an optical member for a liquid crystal display panel, such as, a polarizer (polarization film), a wave plate, a phase contrast plate, an optical compensation film, a brightness improvement film, a light diffusion sheet or a reflective sheet.

EXPLANATION OF REFERENCE NUMERALS

1: Surface protection film
10: Transparent film
12: Substrate layer
14: Back-face layer
20: PSA layer
30: Release liner

The invention claimed is:

1. A transparent film having a substrate layer formed of a transparent resin material, and a back-face layer provided on a first face of the substrate layer, wherein the back-face layer has a thickness of 1 μm or less, and a percent change in coefficient of friction $\Delta\mu$ is less than 10% when the percent change is determined from a coefficient of friction $\mu_{50}$ of the back-face layer after being conserved at a temperature of 50° C. and a relative humidity of 15% for three days and a coefficient of friction $\mu_{80}$ of the back-face layer after being conserved at a temperature of 80° C. and a relative humidity of 80% for three days, with an absolute value of difference between the two coefficients of friction $|\mu_{80}-\mu_{50}|$ being divided by the smaller value of the two coefficients of friction, wherein the back-face layer is formed of a resin material containing a lubricant, and wherein the lubricant includes a reactive lubricant having a functional group capable of bonding to a resin component of the back-face layer.

2. The transparent film according to claim 1, wherein the coefficients of friction $\mu_{50}$ and $\mu_{80}$ are both 0.4 or less.

3. The transparent film according to claim 1, wherein the back-face layer has a monolayer structure and is directly provided on the substrate layer.

4. The transparent film according to claim 1, wherein the back-face layer is formed of a resin material containing an antistatic component.

5. A surface protection film comprising:

the transparent film according to claim 1; and a pressure-sensitive adhesive layer provided on a surface of the transparent film on an opposite side to the back-face layer.

6. The transparent film according to claim 2, wherein the back-face layer has a monolayer structure and is directly provided on the substrate layer.

7. The transparent film according to claim 2, wherein the back-face layer is formed of a resin material containing an antistatic component.

8. A surface protection film comprising:

the transparent film according to claim 2; and a pressure-sensitive adhesive layer provided on a surface of the transparent film on an opposite side to the back-face layer.

9. The transparent film according to claim 3, wherein the back-face layer is formed of a resin material containing an antistatic component.

10. A surface protection film comprising:

the transparent film according to claim 3; and a pressure-sensitive adhesive layer provided on a surface of the transparent film on an opposite side to the back-face layer.

11. A transparent film having a substrate layer formed of a transparent resin material, and a back-face layer provided on a first face of the substrate layer, wherein the back-face layer has a thickness of 1 μm or less, and a percent change in coefficient of friction $\Delta\mu$ is less than 10% when the percent change is determined from a coefficient of friction $\mu_{50}$ of the back-face layer after being conserved at a temperature of 50° C. and a relative humidity of 15% for three days and a coefficient of friction $\mu_{80}$ of the back-face layer after being conserved at a temperature of 80° C. and a relative humidity of 80% for three days, with an absolute value of difference between the two coefficients of friction $|\mu_{80}-\mu_{50}|$ being divided by the smaller value of the two coefficients of friction, wherein the back-face layer is formed of a resin material containing a lubricant, and wherein the lubricant includes a block or graft copolymer-type lubricant.

12. A transparent film having a substrate layer formed of a transparent resin material, and a back-face layer provided on a first face of the substrate layer, wherein the back-face layer has a thickness of 1 μm or less, and a percent change in coefficient of friction $\Delta\mu$ is less than 10% when the percent change is determined from a coefficient of friction $\mu_{50}$ of the back-face layer after being conserved at a temperature of 50° C. and a relative humidity of 15% for three days and a coefficient of friction $\mu_{80}$ of the back-face layer after being conserved at a temperature of 80° C. and a relative humidity of 80% for three days, with an absolute value of difference between the two coefficients of friction $|\mu_{80}-\mu_{50}|$ being divided by the smaller value of the two coefficients of friction, wherein the back-face layer is formed of a resin material containing a lubricant, and wherein the lubricant includes a modified silicone lubricant.

13. transparent film according to claim 1, wherein the reactive lubricant is chosen from:

silicone polymers having at least one reactive functional group selected from the group consisting of an amino group, a hydroxyl group, an epoxy group, an alkoxy group, an acryloyl group, a silanol group and a carboxyl group; and fluorine-containing polymers having at least one reactive functional group selected from the group consisting of an amino group, a hydroxyl group, an epoxy group, an alkoxy group, an acryloyl group, a silanol group and a carboxyl group.

14. The transparent film according to claim 1, wherein the reactive lubricant is chosen from epoxy-modified silicone oils, amino group-modified silicone oils, polyether-modified hydroxyl group-containing polydimethylsiloxanes, and carboxyl group-containing acryl silicone comb graft polymers.

15. The transparent film according to claim 1, wherein the reactive lubricant comprises an epoxy-modified silicone oil.

16. The transparent film according to claim 11, wherein the block or graft copolymer-type lubricant comprises a silicone segment.

17. The transparent film according to claim 11, wherein the block or graft copolymer-type lubricant comprises a fluorine-containing segment.

18. The transparent film according to claim 12, wherein the modified silicone lubricant is a polydimethylsiloxane in which one of the methyl groups in the polydimethylsiloxane is substituted with another functional group.

19. The transparent film according to claim 18, in which the functional group substituting the methyl group is (a) an alkyl group having two or more carbons, (b) a group having an aromatic ring, (c) a polyester chain, (d) a fatty acid, or (e) a polyether chain.

20. The transparent film according to claim 12, wherein the modified silicone lubricant comprises alkyl-modified polydimethylsiloxane.

* * * * *